United States Patent
Jayaraman et al.

(10) Patent No.: US 12,488,672 B2
(45) Date of Patent: Dec. 2, 2025

(54) COMPUTER VISION SYSTEMS AND METHODS FOR DETECTING PERSON DWELL TIME

(71) Applicant: Sensormatic Electronics, LLC, Boca Raton, FL (US)

(72) Inventors: Karthik Jayaraman, Coimbatore (IN); Gopi Subramanian, Delray Beach, FL (US); Rajavenkateswaran Rajamanickam, Coimbatore (IN); Cory Olog Root, Delray Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 123 days.

(21) Appl. No.: 18/479,411

(22) Filed: Oct. 2, 2023

(65) Prior Publication Data

US 2024/0119822 A1  Apr. 11, 2024

Related U.S. Application Data

(60) Provisional application No. 63/378,107, filed on Oct. 3, 2022.

(51) Int. Cl.
*G08B 21/18* (2006.01)
*G06V 20/40* (2022.01)
(Continued)

(52) U.S. Cl.
CPC .......... *G08B 21/182* (2013.01); *G06V 20/44* (2022.01); *G06V 20/52* (2022.01); *G06V 40/172* (2022.01)

(58) Field of Classification Search
CPC .... G08B 21/182; G06V 20/52; G06V 40/172; G06V 20/44
(Continued)

(56) References Cited

U.S. PATENT DOCUMENTS

| 8,502,869 B1 * | 8/2013 | Fuhr | G06Q 30/0201 348/150 |
| 10,733,427 B2 * | 8/2020 | Marcheselli | G06T 7/20 |

(Continued)

FOREIGN PATENT DOCUMENTS

WO  2021124705 A1  6/2021

OTHER PUBLICATIONS

International Search Report and Written Opinion in PCT/US2023/075845, mailed Dec. 1, 2023, 12 pages.

*Primary Examiner* — Zhen Y Wu
(74) *Attorney, Agent, or Firm* — ArentFox Schiff LLP

(57) ABSTRACT

Example implementations include a method, apparatus and computer-readable medium for computer vision detection of dwell time, comprising receiving a plurality of indications of persons entering an environment over a period of time. The implementations further include adding, into a first-in-first-out (FIFO) queue, a respective identifier of a respective person entering the environment and an entry time for each of the plurality of indications, removing, from the FIFO queue, the respective identifier and the entry time of the respective person in response to an indication of an exit of the respective person from the environment at an exit time, calculating an estimated dwell time of the respective person based on a difference in the entry time and the exit time, and generating an alert based on calculating an average dwell time of the persons entering the environment over the period of time based on each estimated dwell time.

20 Claims, 13 Drawing Sheets

(51) Int. Cl.
*G06V 20/52* (2022.01)
*G06V 40/16* (2022.01)

(58) Field of Classification Search
USPC .................................................... 340/573.1
See application file for complete search history.

(56) References Cited

U.S. PATENT DOCUMENTS

| | | | |
|---|---|---|---|
| 2005/0146605 A1* | 7/2005 | Lipton | G08B 13/19615 375/E7.006 |
| 2005/0169367 A1* | 8/2005 | Venetianer | G08B 13/19652 375/E7.006 |
| 2008/0100704 A1* | 5/2008 | Venetianer | G06F 16/7854 348/143 |
| 2008/0109397 A1* | 5/2008 | Sharma | G06Q 30/02 |
| 2010/0026802 A1* | 2/2010 | Titus | H04N 7/188 348/143 |
| 2013/0335572 A1* | 12/2013 | Fuhr | H04N 7/18 348/150 |
| 2014/0249887 A1* | 9/2014 | Parkkinen | G06Q 10/08355 705/7.29 |
| 2015/0345942 A1* | 12/2015 | Allocco | G06V 20/52 382/103 |
| 2019/0026565 A1* | 1/2019 | Ikegami | G06V 10/96 |
| 2019/0102612 A1* | 4/2019 | Takemoto | G06Q 30/0201 |
| 2019/0139258 A1* | 5/2019 | Slattery | G06V 20/52 |
| 2020/0065570 A1* | 2/2020 | Marcheselli | G07C 9/00 |
| 2020/0125855 A1* | 4/2020 | Yamashita | G07C 9/32 |
| 2022/0222830 A1* | 7/2022 | Jia | H04N 23/675 |

* cited by examiner

300

| Hour of the Day | Average Dwell Time (min) | Number of Exits |
|---|---|---|
| 9 | 24 | 28 |
| 10 | 26 | 157 |
| 11 | 27 | 373 |
| 12 | 28 | 401 |
| 13 | 31 | 428 |
| 14 | 37 | 329 |
| 15 | 40 | 252 |
| 16 | 34 | 356 |
| 17 | 34 | 412 |
| 18 | 37 | 532 |
| 19 | 45 | 544 |
| 20 | 67 | 253 |
| Grand Total | 37 | 3965 |

| Hour of the Day | Average Dwell Time (min) | Number of Exits | Residual Entries |
|---|---|---|---|
| 9 | 24 | 28 | 3 |
| 10 | 26 | 157 | 1 |
| 11 | 27 | 373 | 3 |
| 12 | 28 | 401 | 5 |
| 13 | 31 | 428 | 6 |
| 14 | 37 | 329 | 4 |
| 15 | 40 | 252 | 2 |
| 16 | 34 | 356 | 4 |
| 17 | 34 | 412 | 6 |
| 18 | 37 | 532 | 7 |
| 19 | 45 | 544 | 7 |
| 20 | 67 | 253 | 0 |
| Grand Total | 37 | 3965 | 0 |

| Hour of the Day | Average Dwell Time (min) | Customer Count | Group Count | Average Engagement | Number of Transactions | Conversion Rate (%) | Average Transaction Size | Sales | Average Check Size |
|---|---|---|---|---|---|---|---|---|---|
| 9 | 24 | 28 | 13 | Low | 1 | 3.6 | 2.24 | 38 | 38 |
| 10 | 26 | 157 | 71 | Medium | 7 | 4.5 | 2.35 | 329 | 47 |
| 11 | 27 | 373 | 124 | High | 12 | 4.4 | 2.35 | 648 | 54 |
| 12 | 28 | 401 | 182 | | 18 | 4.5 | 2.34 | 954 | 53 |
| 13 | 31 | 428 | 195 | | 19 | 4.4 | 2.41 | 1235 | 65 |
| 14 | 37 | 329 | 150 | | 15 | 4.6 | 2.48 | 1125 | 75 |
| 15 | 40 | 252 | 115 | | 11 | 4.4 | 2.65 | 836 | 76 |
| 16 | 34 | 356 | 162 | | 16 | 4.5 | 2.44 | 1120 | 70 |
| 17 | 34 | 412 | 187 | | 19 | 4.6 | 2.44 | 1368 | 72 |
| 18 | 37 | 532 | 242 | | 24 | 4.5 | 2.45 | 1920 | 80 |
| 19 | 45 | 544 | 247 | | 25 | 4.6 | 2.52 | 1950 | 78 |
| 20 | 67 | 253 | 115 | | 12 | 4.7 | 2.16 | 516 | 43 |
| Grand Total | 37 | 3965 | 1802 | | 179 | | | 12039 | 62.58 |

```
┌─────────────────────────────────────────────────────────────┐
│ Receiving, over the period of time, a plurality of data frames │
│ from one or more cameras depicting a view of an exit point of │──1002
│                    the environment                          │
└─────────────────────────────────────────────────────────────┘
                              ↓
┌─────────────────────────────────────────────────────────────┐
│ Detecting the respective person in the plurality of data frames; │──1004
└─────────────────────────────────────────────────────────────┘
                              ↓
┌─────────────────────────────────────────────────────────────┐
│ Determining that the respective person moved through the exit │──1006
│                    point in the environment                 │
└─────────────────────────────────────────────────────────────┘
                              ↓
┌─────────────────────────────────────────────────────────────┐
│ Generating the indication of the exit of the respective person │
│ from the environment based on determining that the respective │──1008
│     person moved through the exit point in the environment  │
└─────────────────────────────────────────────────────────────┘
```

Fig. 10

COMPUTER VISION SYSTEMS AND METHODS FOR DETECTING PERSON DWELL TIME

CLAIM OF PRIORITY

The present Application for Patent claims priority to U.S. Provisional Application No. 63/378,107 entitled filed on Oct. 3, 2022, and assigned to the assignee hereof and hereby expressly incorporated by reference.

BACKGROUND

Technical Field

The described aspects relate to person detection systems.

INTRODUCTION

Generally, retailers are interested in understanding how much time customers spend inside their retail stores. This is a key to track sales because it is assumed that the more time a customer spends inside a retail store, the greater the likelihood of the customer purchasing an item.

Conventional systems use various techniques such as computer vision, infrared sensor-based people counters to track customers throughout retail stores. These techniques violate privacy of the customers as they tend to capture Personally Identifiable Information (PII) of customers such as facial images, biometrics, etc. Some conventional systems also use other techniques that do not capture PII. However, such techniques are expensive as they need some type of tag or smart card to track customers. Heat maps are another technique used by the conventional systems; however, heat maps provide only spatial information and not the dwell time data of the customer.

Accordingly, there exists a need for improvements in conventional customer detection systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method for computer vision detection of dwell time, comprising receiving a plurality of indications of persons entering an environment over a period of time. The method further includes adding, into a first-in-first-out (FIFO) queue, a respective identifier of a respective person entering the environment and an entry time for each of the plurality of indications. Additionally, the method further includes removing, from the FIFO queue, the respective identifier and the entry time of the respective person in response to an indication of an exit of the respective person from the environment at an exit time. Additionally, the method further includes calculating an estimated dwell time of the respective person based on a difference in the entry time and the exit time. Additionally, the method further includes calculating an average dwell time of the persons entering the environment over the period of time based on each estimated dwell time. Additionally, the method further includes generating an alert in response to the average dwell time being less than a threshold dwell time.

Another example aspect includes an apparatus for computer vision detection of dwell time, comprising one or more memories and one or more processors coupled with the one or more memories and configured, individually or in combination. The processor is configured to receive a plurality of indications of persons entering an environment over a period of time. The processor is further configured to add, into a first-in-first-out (FIFO) queue, a respective identifier of a respective person entering the environment and an entry time for each of the plurality of indications. Additionally, the processor further configured to remove, from the FIFO queue, the respective identifier and the entry time of the respective person in response to an indication of an exit of the respective person from the environment at an exit time. Additionally, the processor further configured to calculate an estimated dwell time of the respective person based on a difference in the entry time and the exit time. Additionally, the processor further configured to calculate an average dwell time of the persons entering the environment over the period of time based on each estimated dwell time. Additionally, the processor further configured to generate an alert in response to the average dwell time being less than a threshold dwell time.

Another example aspect includes an apparatus for computer vision detection of dwell time, comprising means for receiving a plurality of indications of persons entering an environment over a period of time. The apparatus further includes means for adding, into a first-in-first-out (FIFO) queue, a respective identifier of a respective person entering the environment and an entry time for each of the plurality of indications. Additionally, the apparatus further includes means for removing, from the FIFO queue, the respective identifier and the entry time of the respective person in response to an indication of an exit of the respective person from the environment at an exit time. Additionally, the apparatus further includes means for calculating an estimated dwell time of the respective person based on a difference in the entry time and the exit time. Additionally, the apparatus further includes means for calculating an average dwell time of the persons entering the environment over the period of time based on each estimated dwell time. Additionally, the apparatus further includes means for generating an alert in response to the average dwell time being less than a threshold dwell time.

Another example aspect includes a computer-readable medium having instructions stored thereon for computer vision detection of dwell time, wherein the instructions are executable by a processor to receive a plurality of indications of persons entering an environment over a period of time. The instructions are further executable to add, into a first-in-first-out (FIFO) queue, a respective identifier of a respective person entering the environment and an entry time for each of the plurality of indications. Additionally, the instructions are further executable to remove, from the FIFO queue, the respective identifier and the entry time of the respective person in response to an indication of an exit of the respective person from the environment at an exit time. Additionally, the instructions are further executable to calculate an estimated dwell time of the respective person based on a difference in the entry time and the exit time. Additionally, the instructions are further executable to calculate an average dwell time of the persons entering the environment over the period of time based on each estimated dwell time. Additionally, the instructions are further executable to generate an alert in response to the average dwell time being less than a threshold dwell time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which:

FIG. 4 is another example of retail store data, in accordance with exemplary aspects of the present disclosure.

FIG. 5A is yet another example of retail store data, in accordance with exemplary aspects of the present disclosure.

FIG. 10 is a flowchart of additional aspects of the method of FIG. 8;

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure describes systems and methods for determining an average amount of time spent by persons in an environment without capturing/storing Personally Identifiable Information (PII) of customers facial images, biometrics, etc. This information may be used to monitor how persons interact with the environment. For example, a lengthy amount of time spent in a retail environment may suggest that there is a greater likelihood that a person will spend more money. In another example, in a medical environment (e.g., a clinic), an average time spent by patients in the environment may suggest whether the medical staff is efficient at processing patients.

Figure 1:
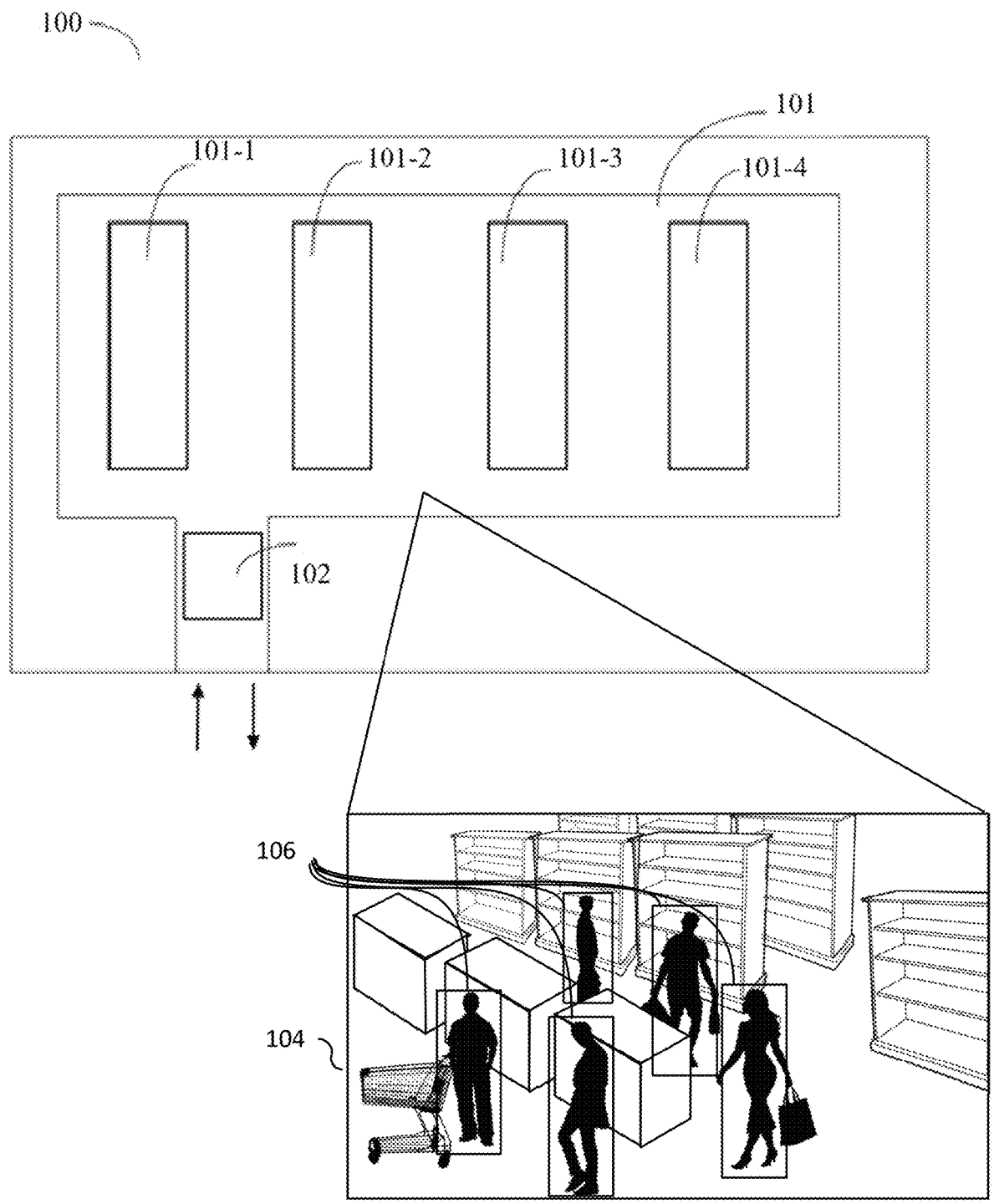
FIG. 1 is a layout of a retail environment, according to some aspects.

Referring now to FIG. 1, a top view layout of a retail environment 100 is shown, according to some aspect. The retail environment 100 is shown to comprise a retail section 101 having one or more sections for display and sale of products. In an aspect, the retail section 101 may correspond to a fashion department of the retail environment 100, wherein section 101-1 may relate to menswear section, section 101-2 may relate to womenswear section, section 101-3 may relate to kids wear section, and section 101-4 may relate to section comprising products which are required for daily needs e.g., handkerchiefs, caps, handbags, wallet and the like.

Persons 106 depicted in camera frame 104 may enter and exit the retail environment 100 through a gateway 102 (e.g., an entry and egress point such as a door). FIG. 1 is shown to have a gateway having the entrance and exit ways adjacent to each other, however the entrance and exit ways may be at different points. Furthermore, the retail environment 100 may have more than one gateway to provide ease of access.

Though the retail section 101 is shown as a fashion wear outlet, the retail section 101 is not limited to only a fashion department and may comprise an outlet for any retail products (e.g., furniture, kitchenware, electronics, and the like). In some aspects, the retail section 101 may correspond to a section of retail establishments including amusement parks, malls, multiplexes, and the like.

A person who has entered the retail environment 100 for shopping may access one or more products which he/she intends to purchase.

In some aspects, the retail environment 100 may have one or more cameras (not shown), such as camera modules 220 (referred to in FIG. 2) for monitoring the retail environment 100 and generating a camera view such as frame 104.

Figure 2:
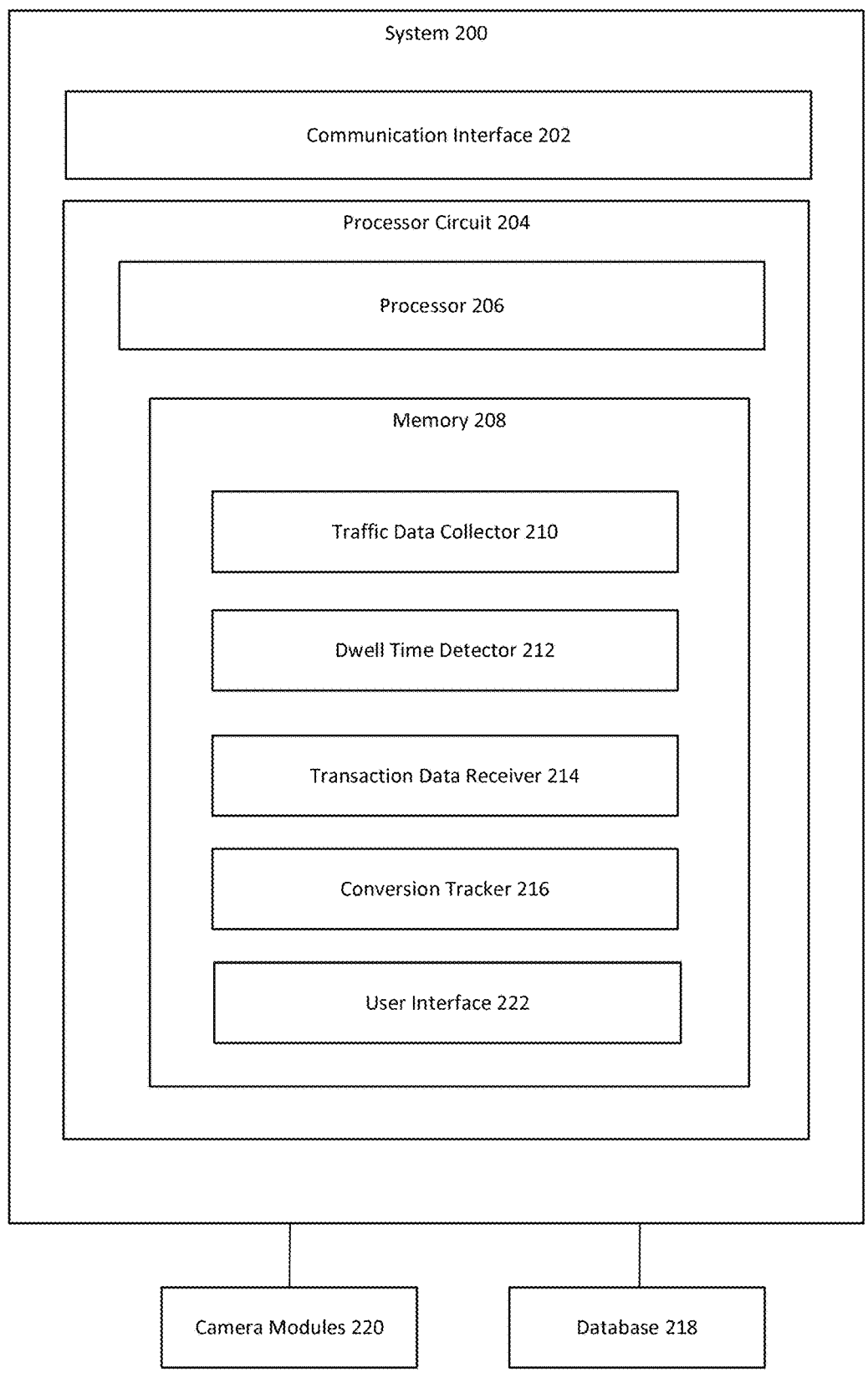
FIG. 2 is a block diagram of a system for determining customer dwell time, in accordance with exemplary aspects of the present disclosure.

Referring to FIG. 2, the system 200 may be one or more controllers, servers, and/or computers located in a security panel or part of a central computing system of a retail environment such as the retail environment 100 (referred to above in FIG. 1). The system 200 is shown to include a communication interface 202 and a processing circuit 204. Communication interface 202 may include wired or wireless interfaces (e.g., jacks, antennas, transmitters, receivers, transceivers, wire terminals, etc.) for conducting data communications with various systems, devices, or networks. For example, communication interface 202 may include an Ethernet card and port for sending and receiving data via an Ethernet-based communications network and/or a Wi-Fi transceiver for communicating via a wireless communications network. Communication interface 202 may be configured to communicate via local area networks or wide area networks (e.g., the Internet, a building WAN, etc.) and may use a variety of communication protocols (e.g., BACnet, IP, LON, etc.).

Communication interface 202 may be a network interface configured to facilitate electronic data communications between the system 200 and various external systems or devices (e.g., camera modules 220, user interface 222, etc.).

The processing circuit 204 is shown to include a processor 206 and a memory 208. The processor 206 may be a general purpose or specific purpose processor, an application specific integrated circuit (ASIC), one or more field programmable gate arrays (FPGAs), a group of processing components, or other suitable processing components. The processor 206 may be configured to execute computer code or instructions stored in memory 208 or received from other computer readable media (e.g., CDROM, network storage, a remote server, etc.).

The memory 208 may include one or more devices (e.g., memory units, memory devices, storage devices, etc.) for storing data and/or computer code for completing and/or facilitating the various processes described in the present disclosure. The memory 208 may include random access memory (RAM), read-only memory (ROM), hard drive storage, temporary storage, non-volatile memory, flash memory, optical memory, or any other suitable memory for storing software objects and/or computer instructions. The memory 208 may include database components, object code components, script components, or any other type of information structure for supporting various activities and information structures described in the present disclosure. The memory 208 may be communicably connected to the processor 206 via the processing circuit 204 and may include computer code for executing (e.g., by processor 206) one or more processes described herein.

The system 200 is shown to be in communication with the one or more camera modules 220. In one example, the camera modules 220 may include an image sensor, video cameras, still image cameras, CCTV cameras, image and video processing systems for monitoring an environment (such as retail environment 100 referred above in FIG. 1). The camera modules 220 may provide data feed comprising one or more images, or video streams pertaining to the environment. In some aspects, the camera modules 220 may provide a timestamped data feed that may be stored in the database 218. Although, FIG. 2 depicts database 218 as part of the system 200, it is to be understood that the database 218 can be a separate component that can be a remote database or cloud storage.

Still referring to FIG. 2, the system 200 is shown to be in communication with the user interface 222 typically, via the communication interface 202. In an aspect, the user interface 222 may be implemented using an electronic device associated with a user that can be selected from, but not limited to, wearable devices (e.g., optical head mounted display, smartwatch, etc.), smart phones and/or mobile devices, desktop, computer, laptop and netbook computing devices, tablet computing devices, digital media devices, personal digital assistant (PDA) and any other device having communication capabilities and/or processing capabilities. In some aspects, the user interface 222 may be associated with a user such as an admin of the retail environment 100 (referred above in FIG. 1).

Still referring to FIG. 2, the system 200 is shown to include a traffic data collector 210. The traffic data collector 210 may be configured to receive one or more data feeds pertaining to an environment from one or more camera modules 220. In some exemplary aspects, the environment may be at least one of a retail store such as retail environment 100 (shown in FIG. 1), a shopping mall, or a specific zone inside a bigger premise, and the camera modules 220 may be installed at an entrance or exit of the environment. The data feed may comprise one or more images or video streams pertaining to the environment. In some aspects, the traffic data collector 210 may receive timestamped data feed from the camera modules 220. In other aspects, the traffic data collector 210 may receive the data feed and timestamp the data feed that is further stored in the database 218. Further, the traffic data collector 210 may analyze the timestamped data feed to determine traffic data such as number of entries and number of exits from the environment during a predetermined time interval such as during each hour of a day. In some aspects, one or more filters may be applied to the traffic data for pre-processing the traffic data. For example, the traffic data may be filtered for normal operating hours. For example, normal operating hours may indicate operating hours of a retail store such as between 9 AM to 8 PM. Such information related to normal operating hours may be stored in the database 218. Thus, in this example, the traffic data collector 210 may determine a number of entries and a number of exits during each hour between 9 AM to 8 PM. Additionally, anomalies in the traffic data may be removed to adjust for employees of the retail store (such as security staffs etc.) who frequently move in and out from the retail store. Such employees are not considered while determining the number of entries and the number of exits.

Still referring to FIG. 2, the system 200 is shown to include a dwell time detector 212. The dwell time detector 212 may be configured to communicate with the traffic data collector 210 to obtain the traffic data. Further, the dwell time detector 212 may apply one or more techniques to analyze the traffic data in order to determine an average dwell time (e.g., an average time spent by persons inside the environment). In some aspects, the person is not an employee of the environment. For example, the dwell time detector 212 may apply a First-in-First-Out (FIFO) ordering technique to analyze the traffic data. By applying the FIFO ordering technique, the person (e.g., customer) to exit the environment first is considered as the person who entered the environment first. Subsequent persons entering the environment are assumed to be subsequent persons leaving the environment in sequence. Further, an average dwell time or average time spent by persons inside the environment during the predetermined time interval may be computed using the FIFO ordering technique.

Figures 3A, 3B:
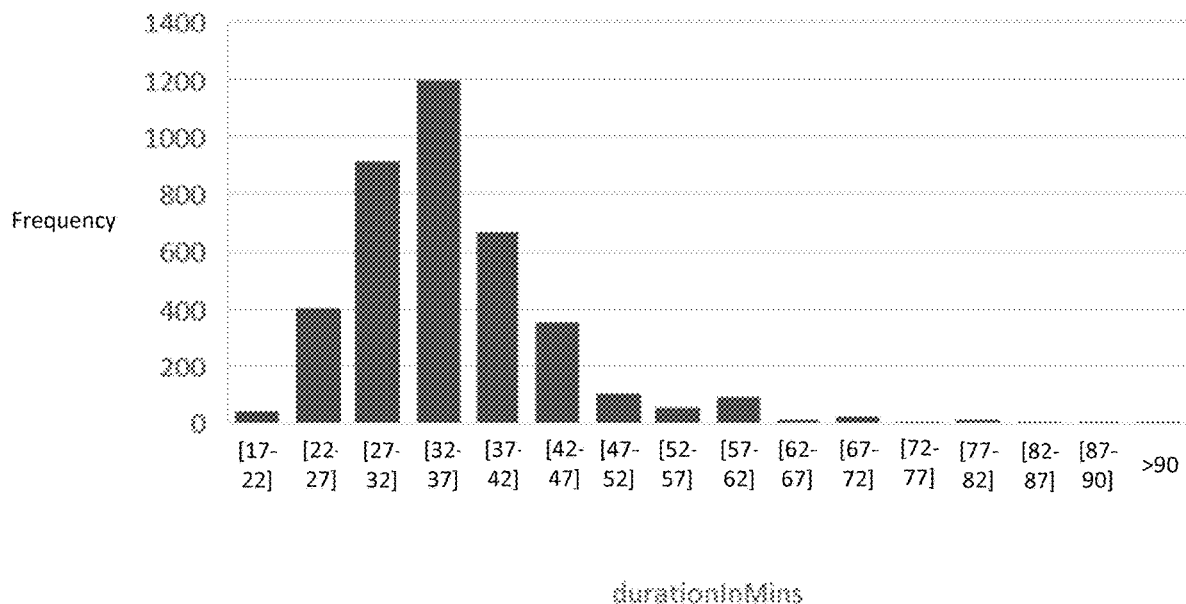
FIG. 3A is an example of retail store data, in accordance with exemplary aspects of the present disclosure.
FIG. 3B is an example of a plot between frequency of customers and duration of time spent, in accordance with exemplary aspects of the present disclosure.

The output of dwell time detector 212 is further shown in FIG. 3A. FIG. 3A shows an example 300 of retail store data showing each hour of the day (e.g., predetermined time intervals, number of exits during each hour of the day and an average time (minutes) spent by customers inside the retail store). As referred above, the average time spent may be computed using the FIFO ordering technique.

It should be noted that although the FIFO ordering technique does not necessarily produce exact results (e.g., the first person to enter a store may leave after the second, third, and fourth person exit, depending on what he/she wants to buy), the use of averaging makes the technique highly effective relative to conventional methods. Conventional methods have a heavy reliance on tracking persons. For example, a tracker may be installed on the shopping cart of a shopper and his entry/exit times may be estimated based on the tracking. However, this involves the involvement of additional hardware (which may fail, degrade over time, undergo reboots/updates, be used improperly by customers, and have additional networking requirements). A basic security camera is typically installed in a retail environment (e.g., for security purposes) and can be used to track entries and exits using computer vision techniques. However, a software element of tracking faces and customer identifiers (i.e., identifying a face entering the environment and initiating a timer until the face is detected during an egress) adds significant processing requirements and causes issues in privacy. Furthermore, if a large amount of people enter and exit an environment regularly, the computations become too costly and cause slowdowns and inefficiencies. The present disclosure introduces a lightweight method for monitoring dwell time using a FIFO ordering technique. The present disclosure also provides ways to overcome potential accuracy issues through residual entry detection as will be described below.

Further, dwell time detector 212 may be configured to generate one or more insights as shown in FIG. 3B. FIG. 3B illustrates an example of a plot 302 between frequency of persons and duration (in minutes) (e.g., average time spent by customers inside the environment). The plot 302 provides one or more insights such as 80% of the customers spent an average of 25 to 45 minutes inside the environment. Also, the plot 302 provides an insight such as an average dwell time or average time spent by persons inside the environment is 37 minutes.

In some aspects, the dwell time detector 212 may perform hourly correction upon determining the average dwell time. The dwell time detector 212 may determine residual entries during the predetermined time interval such as during each hour of the normal store operating hours. In some aspects, the residual entries R may represent one or more persons who have disrupted the FIFO ordering. In such case, actual duration of time spent by such persons may be longer than the dwell time computed by applying the FIFO ordering technique. Thus, residual entries may be determined to perform corrections for an error occurred during computation of the average dwell time. In some aspects, the residual entries may be computed by deducting number of exits from the number of entries during the predetermined time interval and may be represented by equation (1) shown below:

Residual entries=(Number of Entries)−(Number of Exits)    (1)

Further, in some aspects, the dwell time detector 212 may consider the residual entries and apply a Poisson technique to compute an expected time of persons to remain in the environment. The equations (2) and (3) for executing the Poisson technique are shown below:

$$X_{Err} \approx \frac{2*(\text{time}_{hour\ end} - \text{time}_{entry})}{\lambda_t + \lambda_{t+1}} \quad (2)$$

$$\mu_{time\ in\ store} \approx \frac{1}{R}\sum_{R}^{i=1}\frac{2*(\text{time}_{hour\ end} - \text{entry}_i)}{\lambda_t + \lambda_{t+1}} + \frac{1}{N-R}\sum_{N-R}^{n=1}\text{exit}_n - \text{entry}_n \quad (3)$$

In some aspects, a residual entry represents an entry for which no exit is detected. For example, a computer vision algorithm may fail to detect the exit of a person, which may throw off the calculation of dwell time. To correct the calculation, the Poisson technique may be used. For example, there may be sample data where people spend a mean time of 15 minutes. However, due to the missed exit of a person, at 10:10 am, the entries and exits are as such:

Entries: [10:00,10:10,10:20]

Exits: [10:25,10:40]

Here, the residual entries is 1. The FIFO ordering time spent is [25 minutes, 30 minutes], which results in a mean dwell time of 27.5 minutes. Dwell time detector 212 may have an estimate from prior data of mean duration 15 minutes to use here:

Lambda_$t$=Lambda_$(t+1)$=15 minutes

The Poisson estimated mean dwell time is thus given by =⅓*{[2(60)/30]+[2(50)/30]+[2(40)/30]+25+30}=21.66 minutes Accordingly, the Poisson estimate generates a better dwell time that is closer to previous dwell times despite missing data.

Further, FIG. 4 shows an example 400 of retail store data showing information such as hour of the day (e.g., each hour of the normal operating hours), number of exits during each hour, average time spent during each hour, and residual entries during each hour. As referred above, the residual entries may be computed using the above equation (1).

Still referring to FIG. 2, the system 200 is shown to include a transaction data receiver 214 that may be configured to receive transaction data pertaining to the environment. In some aspects, the transaction data may be time-stamped and stored in the database 218. The transaction data may include information such as, but not limited to, person count, group count, number of transactions, average transaction size, and sales amount (e.g., 38$ sale during 9 AM to 10 AM) during the predetermined time interval.

Still referring to FIG. 2, the system 200 is shown to include a conversion tracker 216 that may be configured to communicate with the transaction data receiver 214 and the dwell time detector 212. For example, the conversion tracker 216 may determine an average check size (ACS) during the predetermined time interval based on the transaction data and the average dwell time. Further, the conversion tracker 216 may determine a conversion rate during the predetermined time interval based on the transaction data and the average dwell time.

FIG. 5A shows an example 500 of retail store data showing information such as hour of the day (i.e., each hour of the normal store operating hours), average time spent, customer count, group count, average engagement of staff with customers (such as low, medium, high), number of transactions, conversion rate, average transaction size (ATS), sales, and average check size (ACS) during each hour.

Figure 5B:
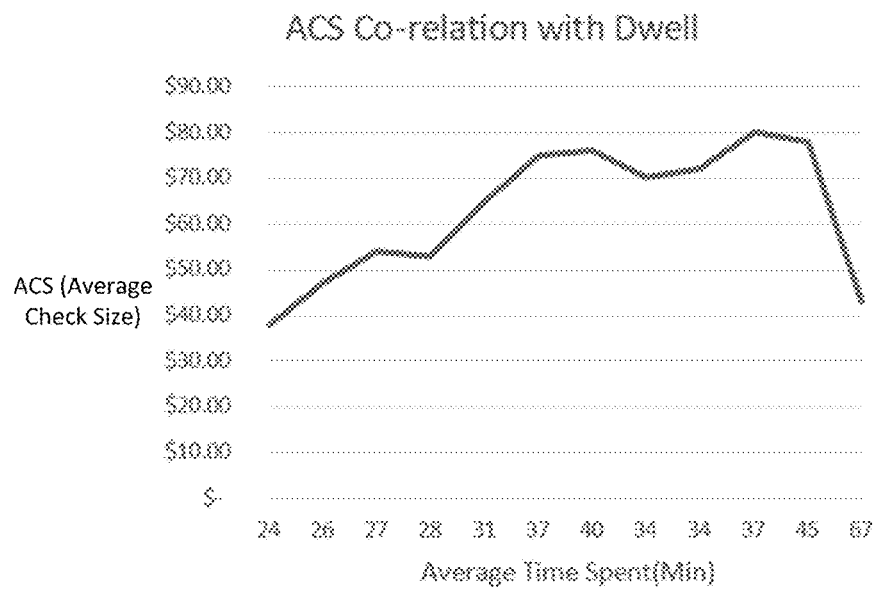
FIG. 5B is an example of a plot between average check size and average time spent by customers, in accordance with exemplary aspects of the present disclosure.

Further, in some aspects, the conversion tracker 216 may determine a co-relation between the average check size and the average time spent based on the retail store data shown in the example 500 of FIG. 5A. In some aspects, the conversion tracker 216 may generate a plot 502 between the average check size and the average time spent as shown in FIG. 5B. The plot 502 provides one or more insights such as the average check size (ACS) initially increases with the average time spent and beyond a critical time such as 37-42 mins, the ACS starts decreasing.

Figure 5C:
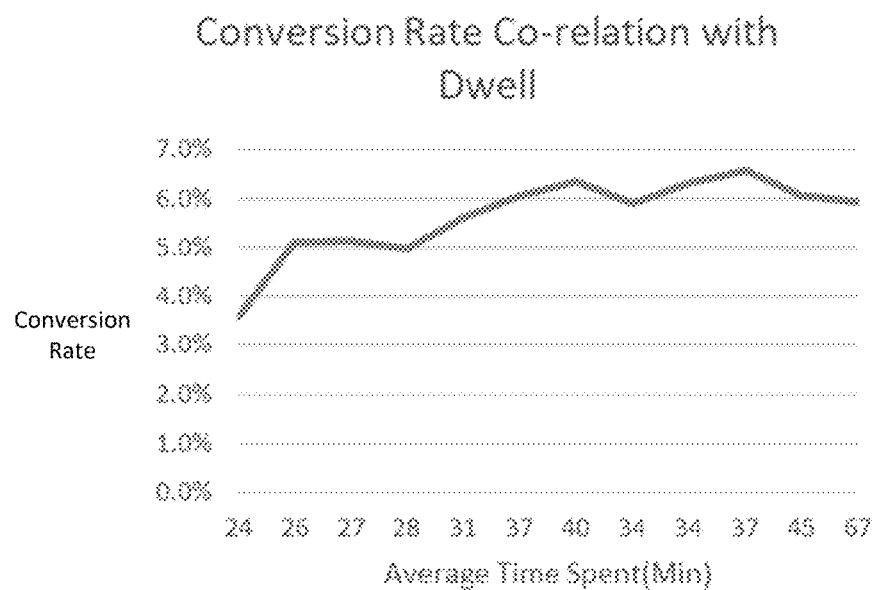
FIG. 5C is an example of a plot between conversion rate and average time spent by customers, in accordance with exemplary aspects of the present disclosure.

Further, in some aspects, the conversion tracker 216 may determine a co-relation between the conversion rate and the average time spent. In some aspects, the conversion tracker 216 may generate a plot 504 between the conversion rate and the average time spent as shown in FIG. 5C. The plot 504 shows the impact of average dwell time on the conversion rate. The plot 504 provides one or more insights such as the conversion rate increases with the dwell time and after a certain time, the conversion rate flattens. Such insights are useful for retailers to track sales, as customer dwell time may be one of the key factors to have an impact on conversion rate. As referred above, an increase in customer dwell time may provide an indication of increase in chances of making a transaction and overall increase in sales. Such insights also help retailers to improve staff engagement with customers so that the customers spend at least the ideal dwell time computed by the system 200 inside the retail store that may improve the sales.

Figure 6:
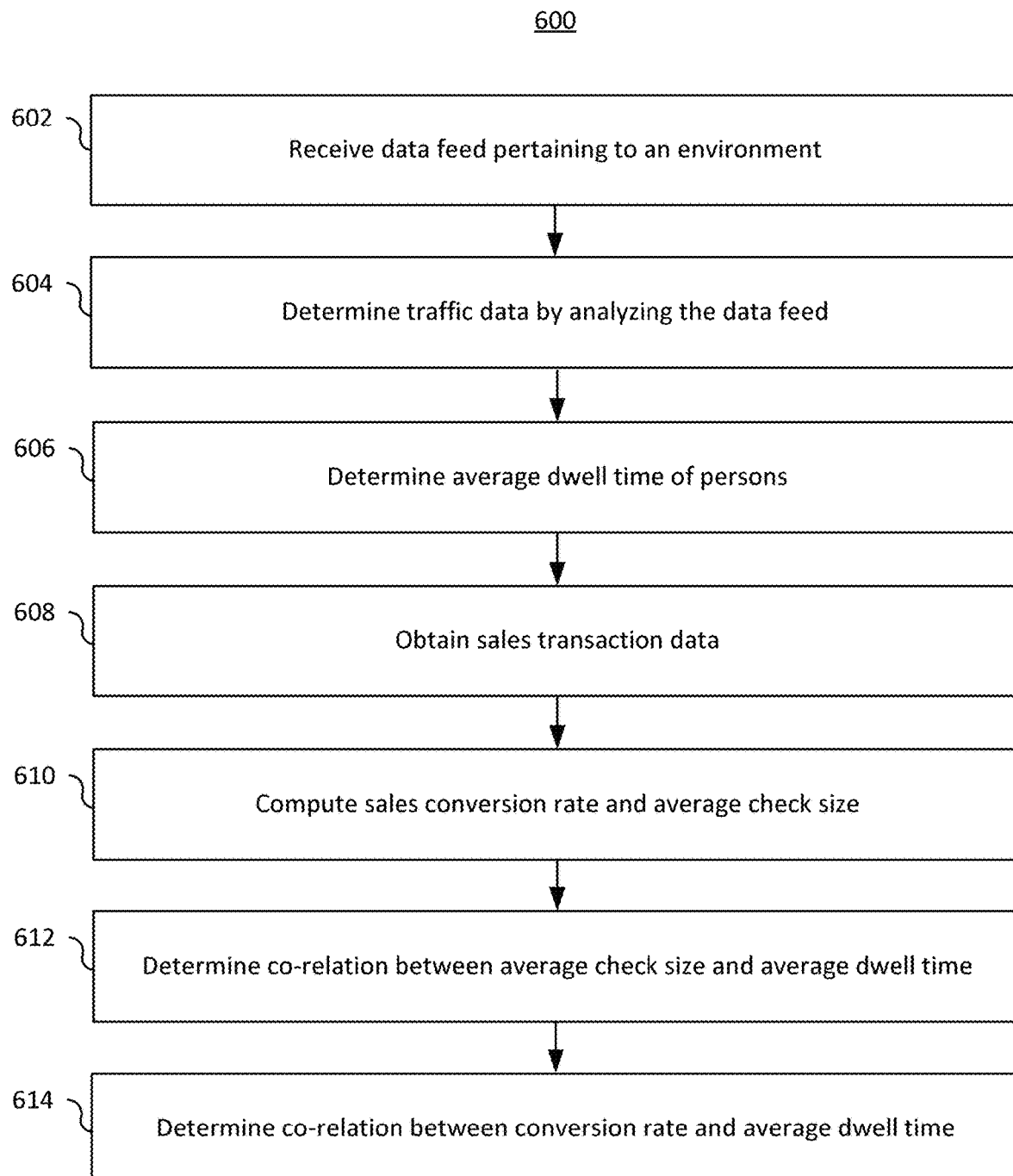
FIG. 6 is a flowchart illustrating method for determining customer dwell time, in accordance with exemplary aspects of the present disclosure.

Now referring to FIG. 6, a flowchart illustrating method 600 for determining customer dwell time, is shown in accordance with exemplary aspects of the present disclosure. In some aspects, the method 600 is performed by the system 200.

The method 600 is shown to include receiving a data feed pertaining to an environment (Step 602). In some aspects, the environment may be at least one of a retail store such as retail environment 100 (shown in FIG. 1), a shopping mall, or a specific zone inside a bigger premise. Further, in some aspects, the data feed may be obtained from one or more camera modules 220 such as CCTV cameras installed at an entrance or exits of the environment. The data feed may comprise one or more images, videos streams pertaining to the environment such as the image frame shown in frame 104. In some aspects, timestamped data feed may be received from the camera modules 220.

Further, the method 600 is shown to include determining traffic data (Step 604). In some aspects, the traffic data may be determined by the traffic data collector 210 (referred above in FIG. 2) that may timestamp the data feed and store in the database 218. Further, the timestamped data feed may be analyzed to determine traffic data such as number of entries and number of exits from the environment during a predetermined time interval such as during each hour of a day. In some aspects, one or more filters may be applied to the traffic data for pre-processing the traffic data. For example, the traffic data may be filtered for normal operating hours. For example, normal operating hours may indicate operating hours of a retail store such as between 9 AM to 8 PM. Such information related to normal operating hours may be stored in the database 218. Thus, in this example, the traffic data collector 210 may determine number of entries and number of exits during each hour between 9 AM to 8 PM. Additionally, anomalies in the traffic data may be removed to adjust for employees of the retail store (such as security staffs etc.) who frequently move in and out from the retail store. Such employees are not considered while determining the number of entries and the number of exits.

The method 600 is further shown to include determining an average dwell time or average time spent by persons inside the environment (Step 606). In some aspects, the average dwell time may be determined by the dwell time detector 212 (referred above in FIG. 2) that may apply one or more techniques to analyze the traffic data in order to determine an average dwell time (e.g., average time spent by persons inside the environment). For example, a FIFO ordering technique may be applied to analyze the traffic data. By applying the FIFO ordering technique, the person to exit the environment first is considered as the person who entered the environment first. Subsequent persons entering the environment are assumed to be subsequent persons leaving the environment in sequence. Further, an average dwell time or average time spent by persons inside the environment during the predetermined time interval may be computed using the FIFO ordering technique.

In some aspects, hourly correction may be performed upon determining the average dwell time. One or more residual entries during the predetermined time interval such as during each hour of the normal store operating hours may be determined. In some aspects, the residual entries R may represent one or more persons who have disrupted the FIFO ordering. In such case, actual duration of time spent by such persons may be longer than the dwell time computed by applying the FIFO ordering technique. Thus, residual entries may be determined to perform corrections for any errors occurred during computation of the average dwell time. In some aspects, the residual entries may be computed by deducting number of exits from the number of entries during the predetermined time interval and may be represented by equation (1) shown previously.

Further, in some aspects, the residual entries may be considered, and a Poisson technique may be applied to compute an expected time of persons to remain in store.

The method 600 is further shown to include obtaining transaction data (Step 608). In some aspects, the transaction data may be received by the transaction data receiver 214 (referred above in FIG. 2). In some aspects, the transaction data may be timestamped and stored in the database 218. The transaction data may include information such as, but not limited to, person count, group count, number of transactions, average transaction size, and sales amount (e.g., $38 sale during 9 AM to 10 AM) during the predetermined time interval.

The method 600 is further shown to include computing conversion rate (Step 610). In some aspects, the conversion rate may be determined by the conversion tracker 216 (referred above in FIG. 2) that may determine an average check size (ACS) based on the transaction data and the average dwell time. Further, a conversion rate during the predetermined time interval may be determined based on the transaction data and the average dwell time.

The method 600 is further shown to include determining a co-relation between the average check size and the average time spent (Step 612). In some aspects, the co-relation between the average check size and the average time spent may be determined by the conversion tracker 216 (referred above in FIG. 2). In some aspects, a plot 502 (shown in FIG. 5B) may be generated between the average check size and the average time spent. The plot 502 may help in providing one or more insights such as the average check size (ACS) initially increases with the average time spent and beyond a critical time such as 37-42 mins, the ACS starts decreasing.

The method 600 is further shown to include determining a co-relation between the conversion rate and the average time spent (Step 614). In some aspects, the co-relation between the conversion rate and the average time spent may be determined by the conversion tracker 216 (referred above in FIG. 2). A plot between the conversion rate and the average time spent may be generated such as the plot 504 shown in FIG. 5C. The plot 504 shows the impact of dwell time on the conversion rate. The plot 504 may provide one or more insights such as the conversion rate increases with the dwell time and after a certain time, the conversion rate flattens.

Figure 7:
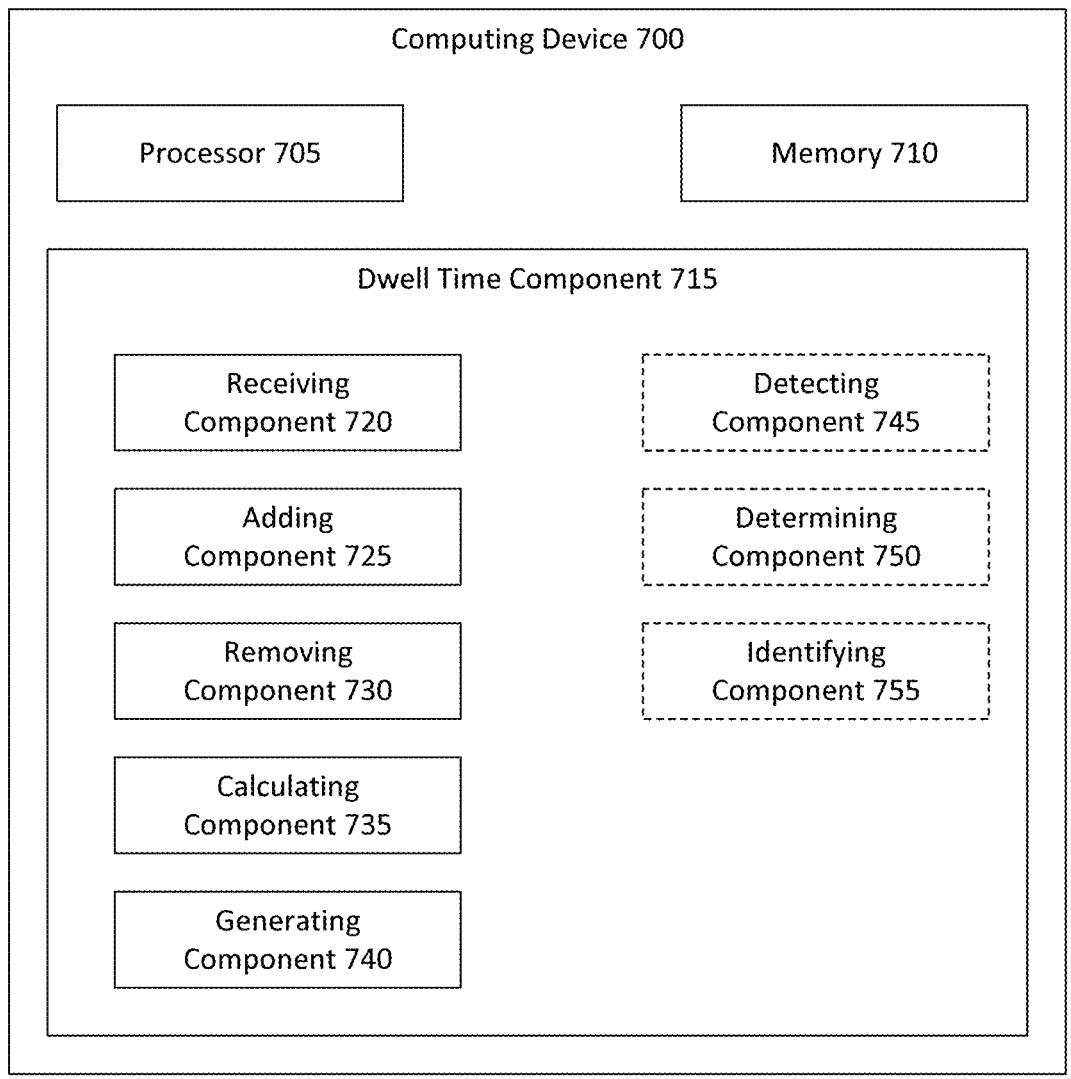
FIG. 7 is a block diagram of an example of a computer device having components configured to perform a method for computer vision detection of dwell time.
Figure 8:
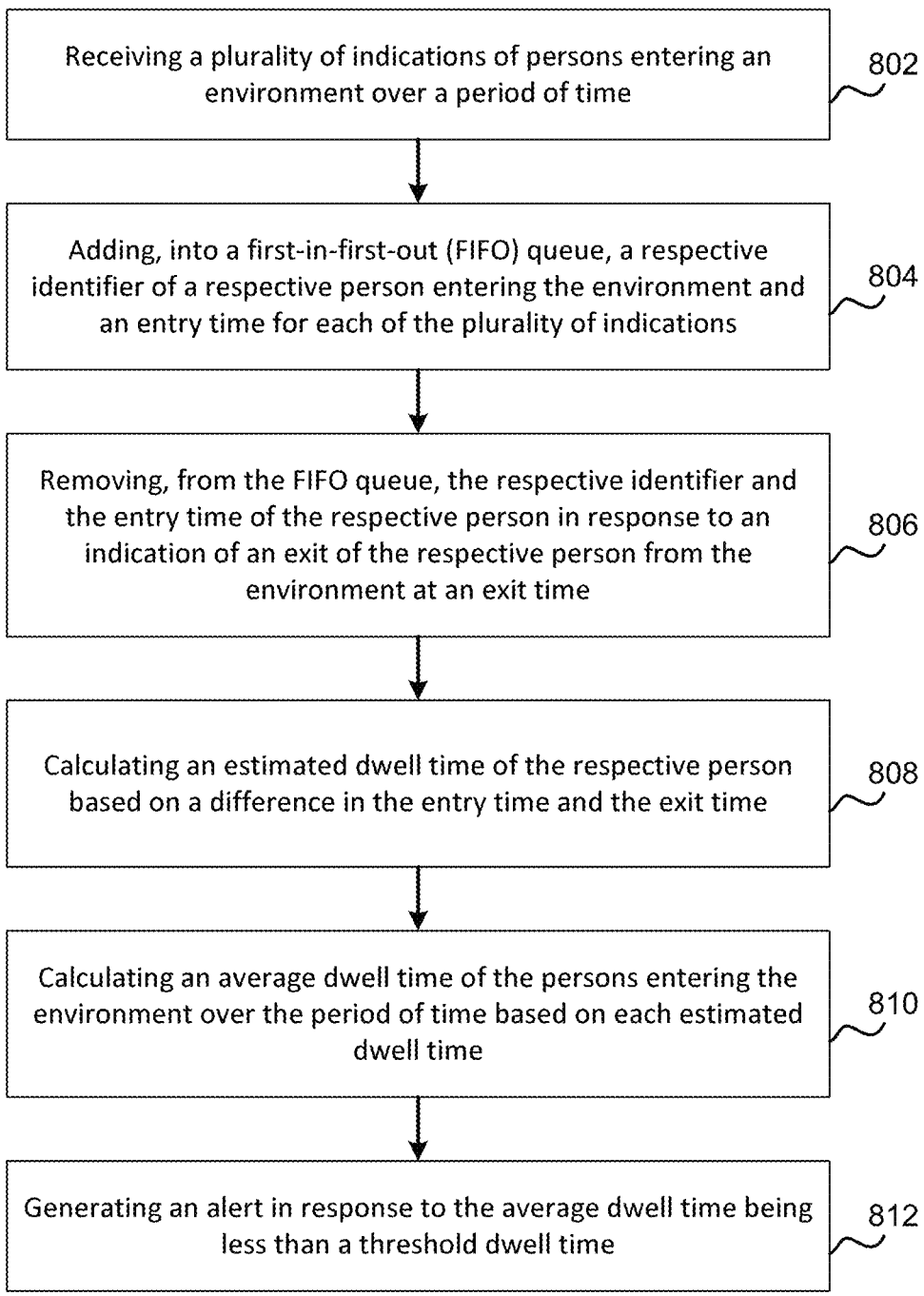
FIG. 8 is a flowchart of an example of a method for computer vision detection of dwell time.

Referring to FIG. 7 and FIG. 8, in operation, computing device 700 may perform a method 800 for computer vision detection of dwell time, by such as via execution of dwell detection component 715 by one or more processors 705 and/or one or more memories 710. It should be noted that computing device 700 may be the same as system 200. For example, processor 206 may correspond to one or more processors 705 and memory 208 may correspond to one or more memories 710. Dwell time component 715 may perform the functionalities of traffic data collector 210 (e.g., via receiving component 720), dwell time detector 212 (e.g., via adding component 725, removing component 730, and calculating component 735), transaction data receiver 214 (e.g., via receiving component 720), conversion tracker 216 (e.g., via calculating component 735), and user interface 222 (e.g., via generating component 740).

At block 802, the method 800 includes receiving a plurality of indications of persons entering an environment over a period of time. For example, in an aspect, computing device 700, one or more processors 705, one or more memories 710, dwell detection component 715, and/or receiving component 720 may be configured to or may comprise means for receiving a plurality of indications of persons 106 entering an retail environment 100 over a period of time (e.g., 24 hours).

For example, there may be a camera at an entry point of the environment that captures a view of persons entering/exiting. In some aspects, an indication of a person entering is generated when dwell time component 715 detects, using computer vision and/or machine learning techniques, that a person has entered a frame (e.g., frame 104). In particular, the person is detected in a portion of the frame associated with the entry/egress point. For example, if a door to an environment is captured in a bottom quadrant of a frame, if the person appears in that quadrant, depending on the orientation of the person (facing the door or facing the interior of the environment), dwell time component 715 determines whether the person entered or exited the environment.

In another example, there may be one or more light emitter and detector sensors placed in the entry/egress point of the environment. Suppose that an emitter is attached to one side of a door and the detector is attached to an opposite side of the door such that the light emitted by the emitter is received by the detector. When the light emitted by a light emitter reaches a detector, there is no obstacle in front of the entry/egress point. When a person enters via the entry/egress point, the detector/emitter is momentarily covered—preventing the emitted light from being received by the detector. Accordingly, this disruption in light receipt may be used to detect an entry/exit and generate an indication. For example, an emitter/detector combination placed at an entry point may detect entries and another emitter/detector combination may be placed an exit point to detect exits.

At block 804, the method 800 includes adding, into a first-in-first-out (FIFO) queue, a respective identifier of a respective person entering the environment and an entry time for each of the plurality of indications. For example, in an aspect, computing device 700, one or more processors 705, one or more memories 710, dwell detection component 715, and/or adding component 725 may be configured to or may comprise means for adding, into a first-in-first-out (FIFO) queue, a respective identifier (e.g., "P1") of a respective person entering the environment and an entry time (e.g., 10 am) for each of the plurality of indications.

In some aspects, the respective identifier may be a combination of numbers, letters, and/or symbols. In an alternative or additional aspect, the respective identifier omits personally identifiable information of the respective person.

An example of a FIFO queue is shown below:

| P1 - 10:00 am |
|---|

Suppose that another person (e.g., "P2") enters the environment at 10:01 am. The FIFO queue may look like:

| P2 - 10:01 am | P1 - 10:00 am |
|---|---|

At block 806, the method 800 includes removing, from the FIFO queue, the respective identifier and the entry time of the respective person in response to an indication of an exit of the respective person from the environment at an exit time. For example, in an aspect, computing device 700, one or more processors 705, one or more memories 710, dwell detection component 715, and/or removing component 730 may be configured to or may comprise means for removing, from the FIFO queue, the respective identifier and the entry time of the respective person in response to an indication of an exit of the respective person from the environment at an exit time (e.g., 10:05 am).

For example, dwell time component 715 may use person detection algorithms (e.g., computer vision and/or machine learning) to determine that a person has exited the environment by arriving at an exit point and not being detectable in a subsequent frame. In another example, using a combination of light emitters and detectors, dwell time component 715 may determine that a person has exited the environment. In this case, the old value in the FIFO queue is removed. The FIFO queue may thus look like:

| P2 - 10:01 am |
|---|

At block 808, the method 800 includes calculating an estimated dwell time of the respective person based on a difference in the entry time and the exit time. For example, in an aspect, computing device 700, one or more processors 705, one or more memories 710, dwell detection component 715, and/or calculating component 735 may be configured to or may comprise means for calculating an estimated dwell time of the respective person based on a difference in the entry time and the exit time.

For example, the entry time popped from the FIFO queue may be 10:00 am and the exit time may be 10:05 am. Accordingly, the difference is 5 minutes. It should be noted that these values are basic examples and that the time difference may be more accurate (e.g., down to a second or millisecond in accuracy).

At block 810, the method 800 includes calculating an average dwell time of the persons entering the environment over the period of time based on each estimated dwell time. For example, in an aspect, computing device 700, one or more processors 705, one or more memories 710, dwell detection component 715, and/or calculating component 735 may be configured to or may comprise means for calculating an average dwell time of the persons entering the environment over the period of time based on each estimated dwell time.

Suppose that at time 10:07 am, another exit is detected. Dwell time component 715 may pop another value from the FIFO queue (e.g., P2–10:01 am). The difference between 10:07 am and 10:01 am is 6 minutes. The two dwell times are averaged and result in 5 minutes 30 seconds as the average dwell time.

In some aspects, the period of time may be 1 hour. Accordingly, every dwell time associated with an entry and exit during the 1 hour is averaged. For example, if 50 people entered the environment and exited the environment between 10:00 am and 11:00 am, the average dwell time is calculated by averaging 50 dwell time values.

In an alternative or additional aspect, the indication of the exit of the respective person from the environment at the exit time is for a different person that entered after the respective person, and wherein the indication of the exit is linked with the respective person instead of the different person based on an ordering within the FIFO queue. This means that the person to enter first may be the second one to leave and the person who entered the environment second may be the first one to leave. Suppose that the first person enters at 10:00 am and exits at 10:07 am. The second person enters at 10:01 am and exits at 10:05 am. This suggests that the person who entered first spent 7 minutes and the person who came second spent 4 minutes. The average dwell time is still 5 minutes 30 seconds. As more people enter/exit an environment, the average dwell time becomes more accurate.

At block 812, the method 800 includes generating an alert in response to the average dwell time being less than a threshold dwell time. For example, in an aspect, computing device 700, one or more processors 705, one or more memories 710, dwell detection component 715, and/or generating component 740 may be configured to or may comprise means for generating an alert in response to the average dwell time being less than a threshold dwell time.

For example, if the threshold dwell time is 10 minutes and the average dwell time is 5 minutes 30 seconds for a given period of time, dwell time component 715 may generate an alert.

In some aspects, the alert may be generated on a graphical user interface on computing device 700. The graphical user interface may depict a table that includes the entries, exits, and dwell times for a plurality of times (e.g., 10-11 am, 11-12 pm, etc.).

In an alternative or additional aspect, the alert comprises recommendations to increase the average dwell time. In this aspect, the recommendations include at least one of physically modifying a layout of the environment, adjusting opening and/or closing times of the environment, or changing a product sold in the environment.

As mentioned previously, dwell time depends on the type of environment. In a retail environment, longer dwell times may promote increased expenditure by customers. Accordingly, if the dwell time is too short, adjusting a physical layout of the environment, changing product selection, and adjusting opening times may improve dwell time. In contrast, for a medical environment, longer dwell times may suggest that medical staff is taking too long to treat and clear patients. Accordingly, recommendations to lower the dwell time such as higher additional staff may be made by dwell time component 715 via an alert.

Figure 9:
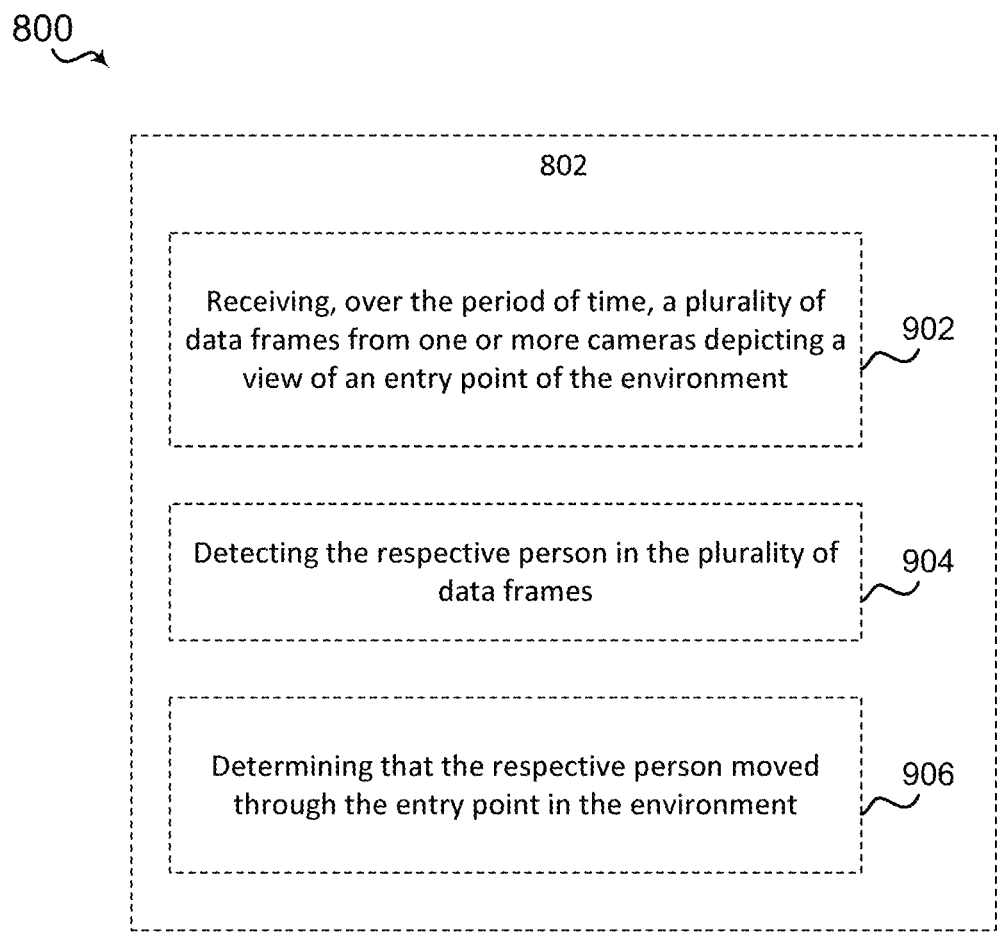
FIG. 9 is a flowchart of additional aspects of the method of FIG. 8.

Referring to FIG. 9, in an alternative or additional aspect, at block 902, the receiving at block 802 of the plurality of indications of the persons entering the environment comprises receiving, over the period of time, a plurality of data frames (e.g., frame 104) from one or more cameras (e.g., camera modules 220) depicting a view of an entry point of the environment.

In this optional aspect, at block 904, the receiving at block 802 of the plurality of indications of the persons entering the environment comprises detecting the respective person in the plurality of data frames.

For example, dwell time component 715 may use computer vision and/or machine learning techniques such as person detection to identify persons 106 in frame 104.

In this optional aspect, at block 906, the receiving at block 802 of the plurality of indications of the persons entering the environment comprises determining that the respective person moved through the entry point in the environment.

For example, one frame may not depict a person. A subsequent frame may depict a person in a portion of the frame where an entry point is located (e.g., bottom left quadrant of a frame). In a second frame, the same person may be detected in a different portion of the frame. The different portion may be away from the entry point (e.g., top right quadrant of the frame). Based on this trajectory, dwell time component 715 may determine that the person has moved through the entry point and into the environment.

Referring to FIG. 10, in an alternative or additional aspect, at block 1002, the method 800 may further include receiving, over the period of time, a plurality of data frames from one or more cameras depicting a view of an exit point of the environment. For example, in an aspect, computing device 700, one or more processors 705, one or more memories 710, dwell detection component 715, and/or receiving component 720 may be configured to or may comprise means for receiving, over the period of time, a plurality of data frames from one or more cameras depicting a view of an exit point of the environment.

In this optional aspect, at block 1004, the method 800 may further include detecting the respective person in the plurality of data frames. For example, in an aspect, computing device 700, one or more processors 705, one or more memories 710, dwell detection component 715, and/or detecting component 745 may be configured to or may comprise means for detecting the respective person in the plurality of data frames.

In this optional aspect, at block 1006, the method 800 may further include determining that the respective person moved through the exit point in the environment. For example, in an aspect, computing device 700, one or more processors 705, one or more memories 710, dwell detection component 715, and/or determining component 750 may be configured to or may comprise means for determining that the respective person moved through the exit point in the environment.

For example, in a first frame, a person may be detected in a portion of the frame that is not where the exit point is located (e.g., top right quadrant of the frame). In a second frame, the same person may be depicted in a portion of the frame where the exit point is located (e.g., bottom left quadrant of a frame). In a third frame, the person may not be detected. Based on this trajectory, dwell time component 715 may determine that the person has moved through the exit point and out of the environment.

In this optional aspect, at block 1008, the method 800 may further include generating the indication of the exit of the respective person from the environment based on determining that the respective person moved through the exit point in the environment. For example, in an aspect, computing device 700, one or more processors 705, one or more memories 710, dwell detection component 715, and/or generating component 740 may be configured to or may comprise means for generating the indication of the exit of the respective person from the environment based on determining that the respective person moved through the exit point in the environment.

Figure 11:
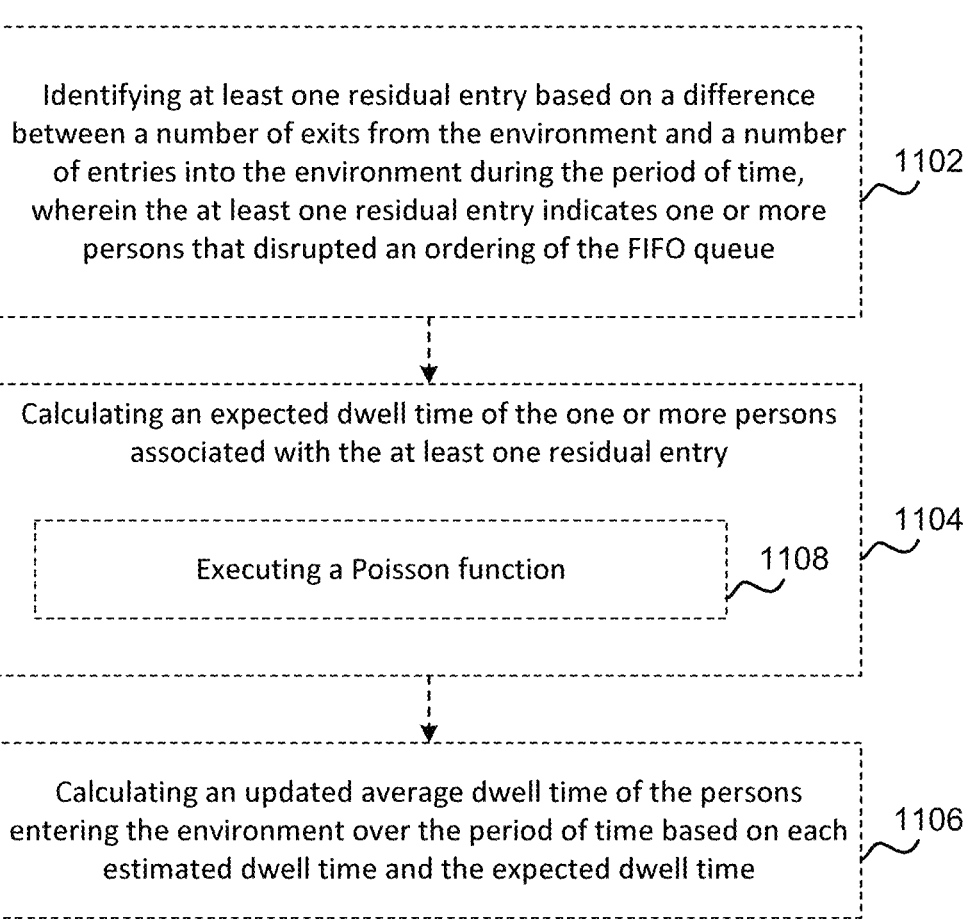
FIG. 11 is a flowchart of additional aspects of the method of FIG. 8.

Referring to FIG. 11, in an alternative or additional aspect, at block 1102, the method 800 may further include identifying at least one residual entry based on a difference between a number of exits from the environment and a number of entries into the environment during the period of time, wherein the at least one residual entry indicates one or more persons that disrupted an ordering of the FIFO queue. For example, in an aspect, computing device 700, one or more processors 705, one or more memories 710, dwell detection component 715, and/or identifying component 755 may be configured to or may comprise means for identifying at least one residual entry based on a difference between a number of exits from the environment and a number of entries into the environment during the period of time, wherein the at least one residual entry indicates one or more persons that disrupted an ordering of the FIFO queue.

As mentioned previously, the entries and exits into an environment may not be precise because persons are not being tracked throughout their stay in the environment (this would require storing PII information, which causes privacy issues and adds storage/processing overhead to the system). Referring to FIG. 4, for a given hour of the day, there may be a certain number of entries and a certain number of exits. For example, at hour 9, there may be 31 entries and 28 exits. This suggests that there are 3 residual entries that do not have corresponding exits.

In this optional aspect, at block 1104, the method 800 may further include calculating an expected dwell time of the one or more persons associated with the at least one residual entry. For example, in an aspect, computing device 700, one or more processors 705, one or more memories 710, dwell detection component 715, and/or calculating component 735 may be configured to or may comprise means for calculating an expected dwell time of the one or more persons associated with the at least one residual entry.

Because there are three entries that do not have exits, the dwell time calculation for those entries need to be calculated differently.

In this optional aspect, at block 1108, the calculating at block 1104 of the expected dwell time comprises executing a Poisson function. This is explained in equations 2 and 3 above.

In this optional aspect, at block 1106, the method 800 may further include calculating an updated average dwell time of the persons entering the environment over the period of time based on each estimated dwell time and the expected dwell time. For example, in an aspect, computing device 700, one or more processors 705, one or more memories 710, dwell detection component 715, and/or calculating component 735 may be configured to or may comprise means for calculating an updated average dwell time of the persons entering the environment over the period of time based on each estimated dwell time and the expected dwell time.

For example, the estimated dwell time of the entries with exits accounted for may be calculated as explained in FIG. 8. The expected dwell time of the residual entries may be calculated using equations 2 and 3. The updated average dwell time may be an average of all of the dwell times (both estimated and expected).

Figure 12:
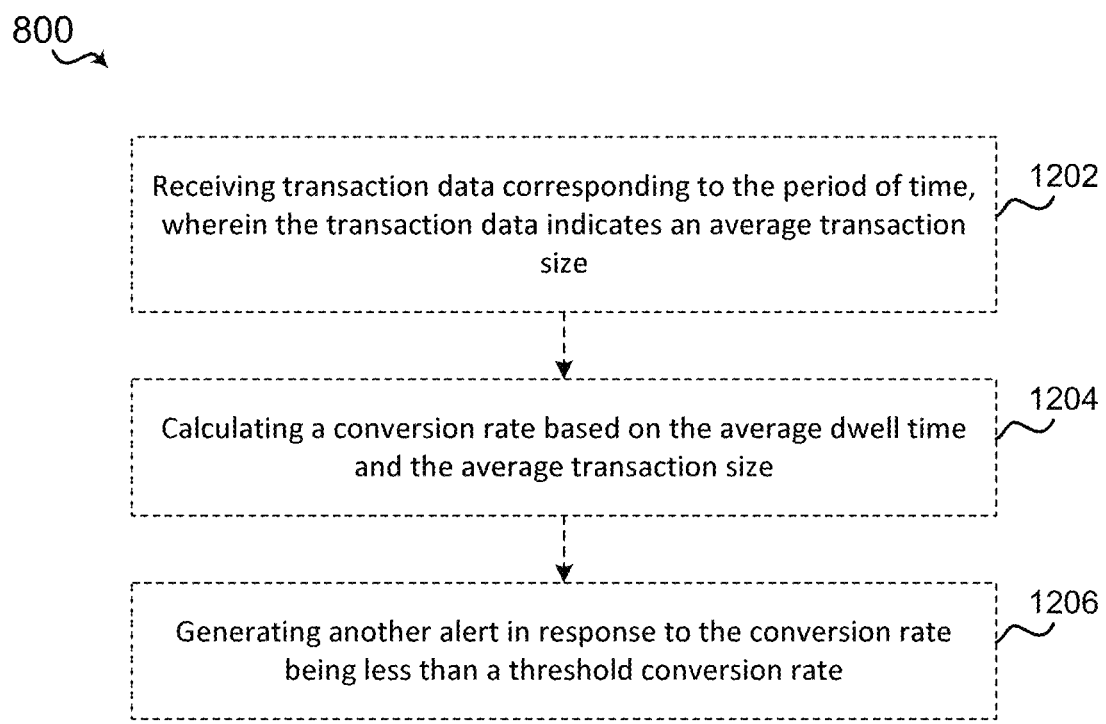
FIG. 12 is a flowchart of additional aspects of the method of FIG. 8.

Referring to FIG. 12, in an alternative or additional aspect, at block 1202, the method 800 may further include receiving transaction data corresponding to the period of time, wherein the transaction data indicates an average transaction size. For example, in an aspect, computing device 700, one or more processors 705, one or more memories 710, dwell detection component 715, and/or receiving component 720 may be configured to or may comprise means for receiving transaction data corresponding to the period of time, wherein the transaction data indicates an average transaction size.

For example, referring to FIG. 5A, the number of transactions and amount of sales may be recorded for each hour. For example, during hour 9, there is one transaction and $38 were earned. The average transaction size is thus $38.

In this optional aspect, at block 1204, the method 800 may further include calculating a conversion size based on the average dwell time and the average transaction size. For example, in an aspect, computing device 700, one or more processors 705, one or more memories 710, dwell detection component 715, and/or calculating component 735 may be configured to or may comprise means for calculating a conversion size based on the average dwell time and the average transaction size.

For example, in FIG. 5A, during hour 9, the average dwell time is 24 minutes and $38 in sales was earned. The conversion size may be given as a ratio of the average transaction size and the average dwell time (e.g., 38/24), which suggests that $1.58 on average were made per minute.

In this optional aspect, at block 1206, the method 800 may further include generating another alert in response to the conversion size being less than a threshold conversion size. For example, in an aspect, computing device 700, one or more processors 705, one or more memories 710, dwell detection component 715, and/or generating component 740 may be configured to or may comprise means for generating another alert in response to the conversion size being less than a threshold conversion size.

For example, a retailer may attempt to maximize the amount of money earned per minute. The retailer may also see patterns such as transaction sizes dropping when the average time spent in the environment decreases. The another alert may be generated on a graphical user interface on computing device 700.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An apparatus for computer vision detection of dwell time, comprising:
   one or more memories; and
   one or more processors coupled with the one or more memories and configured, individually or in combination, to:
   receive a plurality of indications of persons entering an environment over a period of time;
   add, into a first-in-first-out (FIFO) queue, a respective identifier of a respective person entering the environment and an entry time for each of the plurality of indications;
   remove, from the FIFO queue, the respective identifier and the entry time of the respective person in response to an indication of an exit of the respective person from the environment at an exit time;
   calculate an estimated dwell time of the respective person based on a difference in the entry time and the exit time;
   calculate an average dwell time of the persons entering the environment over the period of time based on each estimated dwell time; and
   generate an alert in response to the average dwell time being less than a threshold dwell time, wherein the alert comprises recommendations to increase the average dwell time.

2. The apparatus of claim 1, wherein the recommendations include at least one of physically modifying a layout of the environment, adjusting opening and/or closing times of the environment, or changing a product sold in the environment.

3. The apparatus of claim 1, wherein to receive the plurality of indications of the persons entering the environment comprises to:

receive, over the period of time, a plurality of data frames from one or more cameras depicting a view of an entry point of the environment;

detect the respective person in the plurality of data frames; and determine that the respective person moved through the entry point in the environment.

4. The apparatus of claim 1, wherein the one or more processors are further configured, individually or in combination, to:

receive, over the period of time, a plurality of data frames from one or more cameras depicting a view of an exit point of the environment;

detect the respective person in the plurality of data frames;

determine that the respective person moved through the exit point in the environment; and generate the indication of the exit of the respective person from the environment based on determining that the respective person moved through the exit point in the environment.

5. The apparatus of claim 1, wherein the respective identifier omits personally identifiable information of the respective person.

6. The apparatus of claim 1, wherein the indication of the exit is for is caused by the exit of a different person that entered after the respective person, but is linked with the respective person instead of the different person based on an ordering within the FIFO queue.

7. The apparatus of claim 1, wherein the one or more processors are further configured, individually or in combination, to:

identify at least one residual entry based on a difference between a number of exits from the environment and a number of entries into the environment during the period of time, wherein the at least one residual entry indicates one or more persons that disrupted an ordering of the FIFO queue;

calculate an expected dwell time of the one or more persons associated with the at least one residual entry; and calculate an updated average dwell time of the persons entering the environment over the period of time based on each estimated dwell time and the expected dwell time.

8. The apparatus of claim 7, wherein to calculate the expected dwell time comprises executing a Poisson function.

9. The apparatus of claim 1, wherein the one or more processors are further configured, individually or in combination, to:

receive transaction data corresponding to the period of time, wherein the transaction data indicates an average transaction size; and calculate a conversion size based on the average dwell time and the average transaction size.

10. The apparatus of claim 9, wherein the one or more processors are further configured, individually or in combination, to:

generate another alert in response to the conversion size being less than a threshold conversion size.

11. A method for computer vision detection of dwell time, comprising:

receiving a plurality of indications of persons entering an environment over a period of time;

adding, into a first-in-first-out (FIFO) queue, a respective identifier of a respective person entering the environment and an entry time for each of the plurality of indications;

removing, from the FIFO queue, the respective identifier and the entry time of the respective person in response to an indication of an exit of the respective person from the environment at an exit time;

calculating an estimated dwell time of the respective person based on a difference in the entry time and the exit time;

calculating an average dwell time of the persons entering the environment over the period of time based on each estimated dwell time; and generating an alert in response to the average dwell time being less than a threshold dwell time, wherein the alert comprises recommendations to increase the average dwell time.

12. The method of claim 11, wherein the recommendations include at least one of physically modifying a layout of the environment, adjusting opening and/or closing times of the environment, or changing a product sold in the environment.

13. The method of claim 11, wherein receiving the plurality of indications of the persons entering the environment comprises:

receiving, over the period of time, a plurality of data frames from one or more cameras depicting a view of an entry point of the environment;

detecting the respective person in the plurality of data frames; and determining that the respective person moved through the entry point in the environment.

14. The method of claim 11, further comprising:

receiving, over the period of time, a plurality of data frames from one or more cameras depicting a view of an exit point of the environment;

detecting the respective person in the plurality of data frames;

determining that the respective person moved through the exit point in the environment; and generating the indication of the exit of the respective person from the environment based on determining that the respective person moved through the exit point in the environment.

15. The method of claim 11, wherein the respective identifier omits personally identifiable information of the respective person.

16. The method of claim 11, wherein the indication of the exit is caused by the exit of a different person that entered after the respective person, but is linked with the respective person instead of the different person based on an ordering within the FIFO queue.

17. The method of claim 11, further comprising:

identifying at least one residual entry based on a difference between a number of exits from the environment and a number of entries into the environment during the period of time, wherein the at least one residual entry indicates one or more persons that disrupted an ordering of the FIFO queue;

calculating an expected dwell time of the one or more persons associated with the at least one residual entry; and calculating an updated average dwell time of the persons entering the environment over the period of time based on each estimated dwell time and the expected dwell time.

18. The method of claim 17, wherein calculating the expected dwell time comprises executing a Poisson function.

19. The method of claim 11, further comprising:
receiving transaction data corresponding to the period of time, wherein the transaction data indicates an average transaction size; and
calculating a conversion size based on the average dwell time and the average transaction size.

20. The method of claim 19, further comprising:
generating another alert in response to the conversion size being less than a threshold conversion size.

\* \* \* \* \*